N. C. LOCKE,
Assignor, by mesne assignments, to THE LOCKE REGULATOR COMPANY.
STEAM AND WATER PRESSURE REGULATOR.
No. 10,018. Reissued Jan. 31, 1882.
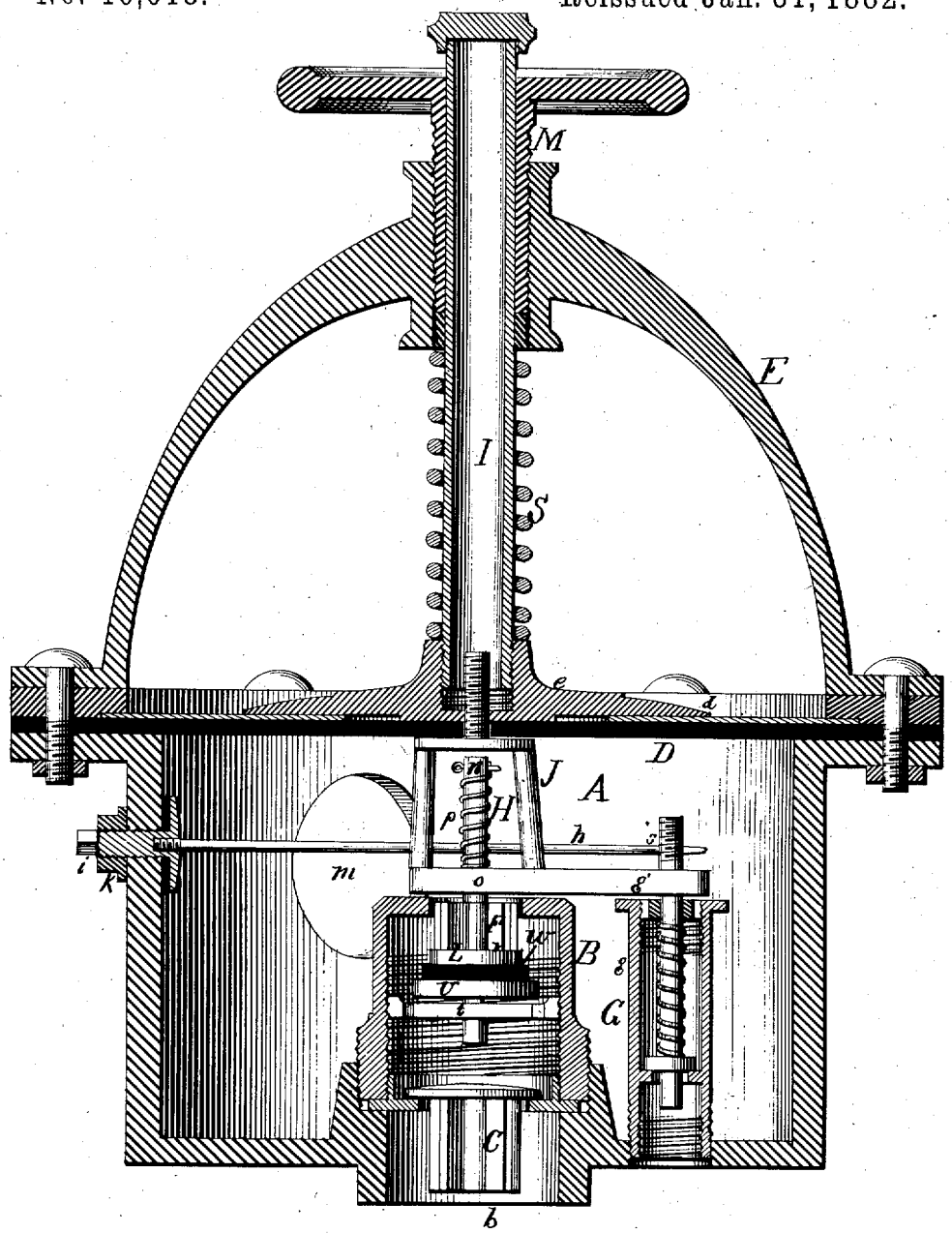
Witnesses:
William D. Dennis
John J Saunders
Inventor:
Nathaniel C. Locke

UNITED STATES PATENT OFFICE.

NATHANIEL C. LOCKE, OF SALEM, MASSACHUSETTS, ASSIGNOR, BY MESNE ASSIGNMENTS, TO THE LOCKE REGULATOR COMPANY, OF CONNECTICUT.

STEAM AND WATER PRESSURE REGULATOR.

SPECIFICATION forming part of Reissued Letters Patent No. 10,018, dated January 31, 1882.

Original No. 113,069, dated March 28, 1871; Reissue No. 7,108, dated May 16, 1876. Application for reissue filed May 17, 1881.

*To all whom it may concern:*

Be it known that I, NATHANIEL C. LOCKE, of Salem, in the county of Essex and State of Massachusetts, have invented Improvements in Steam and Water Pressure Regulators, of which the following is a specification.

This invention, while applicable to pressure-regulators irrespective of the nature of the fluid which may pass through them, is mainly designed to be used for regulating the supply at a reduced and uniform pressure of steam or water, but more particularly the latter, as in case of water supplied from street-mains to the interior of buildings for various purposes, and in which it is an object to keep the pressure of said supply lower than in the main.

The invention consists essentially in the combination, in a pressure-regulator constructed to be connected with a street-main or other supply-pipe and having a receiving-chamber and a supply-valve, of a relief-valve constructed and arranged to prevent any excess of pressure in the receiving-chamber, as hereinafter described.

The invention also consists in a yielding connection between a supply-valve and the diaphram or piston in the receiving-chamber, whereby, after the supply-valve is closed, the diaphragm or piston can have a further upward movement, and thus operate upon a safety or relief valve; and, furthermore, this invention consists in combining a soft reversible packing in the supply-valve with a prolongation of the valve, whereby said packing, while it secures the valve against leakage, is protected from the cutting action of the fluid passing the valve.

The invention also embodies other features, which will be fully described, and pointed out in the claims.

The accompanying drawing represents a vertical section of a pressure-regulator embodying my invention.

A represents the receiver of a water-pressure regulator designed to be connected with a street-main or other supply-pipe, and to which *b* is the inlet. Said inlet *b* communicates with a valve-box, B, which is fitted with a check-valve, C, to prevent return of water to the main or other supply-pipe and possible collapse of the pipes and other attachments in the building when flooding or drawing off the water from the main or other supply-pipe, which device has been made the subject of a previous application for patent by me. The valve-box B is also provided above the check-valves C with a supply-valve, F, having soft or yielding packing *w*, and opening downward or against the current through the valve-box B, and which is opened by the downward movement of the loaded piston or diaphragm D and closed by the excess of pressure against the under side of diaphragm D, according as the pressure of the water is diminished or increased in valve-box B. Soft packing *w* of valve F is in this case composed of rubber, plumbago, &c., and is readily renewed when required, as the force acting upon valve F in closing tends to press the hard metal of the valve-seat into the yielding surface of packing *w*, so that sediment, which may be caught between the seat and packing and cause leakage in the ordinary valve, is in this pressed into the yielding surface of the soft packing, still admitting of actual contact of the valve and seat and insuring a tight joint.

L is an extension or prolongation of valve F, and is made of a form and shape to nicely and closely fit the valve-opening, so that before the fluid in the receiver can pass through the valve-opening the full length of the prolongation must be drawn out of and its end *v* made to clear the valve-opening N, and obviously if this extension or prolongation L be either long or short, packing *w* of valve F will be carried correspondingly a greater or less distance away from the valve-opening, thereby proportionately removing it from the direct line of flow or course of the fluid through the valve-opening and securing protection to it against being cut or worn away by the said fluid. The prolongation L of valve F also subserves the purpose of preventing a constant humming or buzzing noise without such extension to the valve entirely filling the valve-opening. The least leak in the faucets in the house beyond the regulator would cause a slight but rapid motion of the valve upon its seat by reason of the two opposing forces acting upon the valve, and hence the noise referred to; but by reason of the extension no water can pass until the two faces of the valve are removed sufficiently to allow of the withdrawal of the said extension; but if the extension permitted much water to pass it before being drawn out it would not answer the purpose for which it is intended. Obviously this part of the invention is particularly applicable to and important for valves for the use of steam alone.

Flexible diaphragm D is provided with a metallic covering, to prevent leakage.

S is the spring by which the diaphragm D is loaded to the required pressure. Said spring is coiled around the stem I, and acts upon the diaphragm D to keep it down by its arrangement between the base-piece *e* and adjusting nut or box M, which fits by a screw-thread on its exterior, through frame E, made fast to the receiver. The stem I is fitted to slide up and down through this adjusting-box M, so that by turning the box M to the right or left the spring S is more or less compressed and made to act with a force on the diaphragm D. Such devices form a simple means for varying the action of the pressure-regulator to shut off the supply to it at any desired or given pressure.

H is a yielding connection between supply-valve F and the diaphragm or piston D. A yoke, J, is screwed to the lower end of the stem I, which also confines the diaphragm thereto, as shown. A stem, *n*, of supply-valve F passes up through a hole in the bottom portion, *o*, of yoke J, and is free to move therein. The valve F, by its stem *n*, is held in close connection to the diaphragm or piston D, for a quick opening of the valve when the diaphragm moves downward, by a spring, *p*, as well as by the pressure under the valve F in the valve-box B, so far as, in the upward movement of the diaphragm or piston, the closing or seating of the valve will allow, when, by reason of the yielding connection H, the diaphragm or piston can still rise if the pressure continues or increases in the receiver.

The safety or relief valve G is kept closed by a spring, *g*, and is opened by the upward movement of the yoke J through an extension, *g'*, of said yoke, lifting an elastic wedge, *h*, fitting through a slot in the stem *s* of the safety-valve and adjustable from the exterior of the receiver by a screw-box, *i*, on which may be screwed a locking-nut, *k*, the turning of the screw-box *i*, when the locking-nut *k* is slackened, serving to project the elastic wedge *h* more or less through the slot in the stem *s* of the valve G, whereby the timely action of said valve relatively to the diaphragm to give speedier or tardier relief may be varied. By thus providing for the adjustment of the safety-valve from the outside of the receiver the breaking of the diaphragm-joint to effect adjustment of the valve is avoided.

Heretofore the connection in pressure-regulators between the diaphragm or piston and supply-valve has been rigid, preventing any independent movement of either the diaphragm or supply-valve without a corresponding movement of the other, while with a yielding connection, substantially as described, the diaphragm or piston, if there is any increase of pressure upon it caused by leakage or expansion of water after the supply-valve has closed, can continue to rise, and thus allow it (the diaphragm or piston) to act upon and open the relief-valve G, thereby equalizing the pressure in the receiver.

The receiver A may have any number of outlets *m*, by which the fluid, under a uniform pressure, is taken or supplied to the pipes.

Although the spring *p* on stem *n* serves to keep the supply-valve F up to the diaphragm so far as the limited upward movement of the supply-valve will allow it, it can be dispensed with, for the upward pressure against the under part of the supply-valve will always be sufficient to force the valve up to its seat so far as the diaphragm in its movement will admit. A bar, *t*, in the valve-box B prevents, in case the spring *p* is not used, the falling of the valve F beyond a proper position for operation.

Great advantages in operating a safety-valve by a diaphragm or piston are obtained, among which may be mentioned the increased power by reason of the larger surface of the diaphragm or piston; also, the pressure operating the diaphragm or piston, and through it the safety or relief valve, being independent of the pressure under the safety or relief valve which heretofore has operated the same, and to the insuring of a full opening of the safety or relief valve, so as to quickly, freely, and effectually relieve the pressure in the receiver.

I am well aware that soft yielding packings have been used in valves having a prolongation or extension of the valve which enters the valve-opening for preventing water-hammer by partially stopping the flow before the valve is closed. Therefore I disclaim the use of the extending portion for such purpose, and confine myself to a valve having a closely-fitting projection combined with a soft renewable packing.

Having now described my invention, what I claim, and desire to secure by Letters Patent, is—

1. The combination, in a pressure-regulator constructed to be connected with a street-main or other supply-pipe and having a receiving-chamber, A, of a supply-valve, F, and safety-valve G, when both valves are so arranged as to be operated by one and the same diaphragm, substantially as shown and described.

2. The yielding connection between the supply-valve F and the diaphragm or piston D, whereby, after the supply-valve is closed, the diaphragm or piston can have a further upward movement, and thus operate upon a safety or relief valve, substantially as described.

3. The combination, in a pressure-regulator constructed with a receiving-chamber, A, a flexible diaphragm, D, and a check-valve, C, of a relief-valve, G, substantially as and for the purpose described.

4. In a pressure-regulator having receiver A, supply-valve F, loaded diaphragm D, and safety-valve G, the combination of extension $g'$, of yoke J, carried by the stem of valve F and so arranged as to engage with stem $s$ of safety-valve G, for operation substantially as described.

5. The combination, in a valve having body B, with metallic seat and valve-opening, and having valve F, with projection L closely fitting and entirely filling said opening, of the soft renewable packing, all combined for operation, substantially as shown and described, and for the purpose specified.

NATHANIEL C. LOCKE.

Witnesses:

EBEN N. WATSON,

CHAS. A. ESTES.